(12) United States Patent
Madin et al.

(10) Patent No.: US 10,300,637 B2
(45) Date of Patent: May 28, 2019

(54) SYSTEMS AND METHODS FOR INTERNAL THREAD FORMING IN COMPOSITE MATERIALS

(71) Applicant: FORD GLOBAL TECHNOLOGIES, LLC, Dearborn, MI (US)

(72) Inventors: Mark Michael Madin, Canton, MI (US); Christopher Donald Wicks, Allen Park, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 392 days.

(21) Appl. No.: 15/062,892

(22) Filed: Mar. 7, 2016

(65) Prior Publication Data
US 2017/0252949 A1    Sep. 7, 2017

(51) Int. Cl.
| | | |
|---|---|---|
| *B29C 39/10* | (2006.01) | |
| *B29C 39/26* | (2006.01) | |
| *B29C 33/12* | (2006.01) | |
| *B29K 101/12* | (2006.01) | |
| *B29K 277/00* | (2006.01) | |
| *B29K 307/04* | (2006.01) | |

(52) U.S. Cl.
CPC .............. *B29C 39/10* (2013.01); *B29C 33/12* (2013.01); *B29C 39/26* (2013.01); *B29K 2101/12* (2013.01); *B29K 2277/10* (2013.01); *B29K 2307/04* (2013.01)

(58) Field of Classification Search
CPC ......... B29C 39/10; B29C 33/12; B29C 39/26; B29K 2307/04; B29K 2101/12; B29K 2277/10
See application file for complete search history.

(56) References Cited

U.S. PATENT DOCUMENTS

| | | |
|---|---|---|
| 8,061,946 B2 | 11/2011 | Komine |
| 8,882,425 B2 | 11/2014 | Benjamin et al. |
| 2009/0116929 A1 | 5/2009 | Shea et al. |
| 2011/0132486 A1 | 6/2011 | Martin |
| 2014/0314442 A1* | 10/2014 | Massaro, Jr. ...... G03G 15/0894 399/109 |

* cited by examiner

*Primary Examiner* — Robert J Grun
(74) *Attorney, Agent, or Firm* — Raymond L. Coppiellie; King & Schickli PLLC (57) ABSTRACT

Systems for defining an internally threaded bore in a composite material component include one or more thread forming tools each defining a thread forming portion and a locating fixture configured to hold the one or more thread forming tools in a predetermined configuration defining a pattern of internally threaded bores to be provided in the composite material component. The thread forming portions include a plurality of thread forming surfaces each defining a pitch, a crest fillet radius, and a root fillet radius, and define internally threaded bores having an interior helical thread defining a plurality of full crest radii and a plurality of full root radii. A component forming fixture is provided for abutting the locating fixture whereby the one or more thread forming tools are held in an interior of the forming fixture. Methods for forming composite material components having internally threaded bores using the described systems are described.

13 Claims, 7 Drawing Sheets

SYSTEMS AND METHODS FOR INTERNAL THREAD FORMING IN COMPOSITE MATERIALS

TECHNICAL FIELD

This disclosure relates generally to motor vehicle components comprised of composite materials. More particularly, the disclosure relates to a system and method for providing internally threaded bores in components formed of such composite materials, to allow securing the components to one another or to other adjacent components.

BACKGROUND

It is known to provide composite vehicle components wherein a portion of the component is manufactured of a metal and another portion of the component is manufactured of a non-metallic material. As a non-limiting example, cam carriers may be manufactured of non-metallic materials for attaching to metal vehicle cylinder heads, for example made of aluminum or other machined or cast metal. Examples of such composite materials include componentry manufactured of materials such as thermoplastics and thermoplastic resins, fiber-reinforced thermoplastics and thermoplastic resins, carbon fiber-reinforced materials, Kevlar-reinforced materials, materials reinforced with other synthetic fibers, and the like, intended to be attached to other cooperating components manufactured of composite or non-composite materials such as aluminum or other metals or alloys.

During fabrication of vehicle components from composite (or non-composite) materials, it is often necessary to provide internally threaded bores to allow securing such components to other cooperating components. As an example, it is known to fabricate a cam carrier of a thermoplastic resin, and to include a plurality of internally threaded bores to allow securing the composite material cam carrier to another vehicle component made of a composite or other material. During vehicle fabrication, the cam carrier is aligned with and secured to a metal cylinder head, and a camshaft is secured to the cam carrier by a plurality of bearings. Conventionally such internally threaded bores are provided in a cast, molded or otherwise formed composite material by cutting a suitably dimensioned bore using a bit that concurrently forms the desired internal threads therein.

Such composite materials are suitably durable for fabricating vehicle components by a variety of molding and casting processes, and provide an additional advantage of lighter weight, which in turn realize advantages of lighter weight vehicles, improved fuel efficiency, etc. In turn, because composite materials can be formed into components by more convenient and versatile casting or molding methods rather than only by machining metal to a desired shape, more complex component designs are made possible which are faster and less costly to fabricate. However, composite materials can be less durable than conventional metallic materials, particularly when formed into thinner elements such as thin sidewalls, screwthreads, and the like.

Because of the lesser durability of composite materials compared to traditional metals and alloys, manufacturers provide supplemental measures to address the challenges associated with fastening composite components to one another or to adjacent, potentially non-composite components, that is to provide the desired clamp load while reducing the potential of fracture of composite material screwthreads such as in bores defined in the composite materials. Such measures include use of adhesives and/or metallic inserts with and without crush limiters to provide a desired clamp load between adjacent components fastened to each other and to reinforce the clamping loads possible with composite material screwthreads. While effective for their intended purpose, such measures add cost and complexity to the manufacturing process.

To solve the foregoing and other problems, the present disclosure describes systems and methods for providing internally threaded bores in vehicle and other components. Advantageously, the described systems and methods provide composite material components having threaded bores defined in predetermined portions of the components, allowing easy alignment with and securing of the composite component to an adjoining vehicle component.

SUMMARY

In accordance with the purposes and benefits described herein, in one aspect a system for defining an internally threaded bore in a formed component is described, comprising one or more thread forming tools each defining a thread forming portion. The system further includes a locating fixture configured to hold the one or more thread forming tools in a predetermined configuration defining a pattern of internally threaded bores to be provided in the formed component. In embodiments, the one or more thread forming tools each further define a locating fixture-spanning shank and a removal tool-engaging head. A component forming fixture is provided for abutting the locating fixture whereby the one or more thread forming tools are held in an interior of the forming fixture.

In embodiments, the thread forming portion comprises a plurality of thread forming surfaces each defining a pitch, a crest fillet radius, and a root fillet radius. Accordingly, in use the thread forming surfaces of the thread forming tools each define a bore having an interior helical thread defining a plurality of full crest radii and a plurality of full root radii.

In another aspect, a method for defining a threaded bore in a formed component is provided, comprising providing one or more thread forming tools each defining a thread forming portion as described above, and by a locating fixture holding the one or more thread forming tools in a predetermined configuration defining a desired pattern of internally threaded bores to be defined. Next, the locating fixture is disposed adjacent to a forming fixture configured to define the formed component whereby the one or more thread forming tools are held in an interior of the forming fixture. A component-forming material is dispensed into the forming fixture to define the component around the one or more thread forming tools. The material may be a composite material.

The locating fixture is then removed to reveal the component having the one or more thread forming tools held thereby. On removing the one or more held thread forming tools, the component having internally threaded bores is revealed.

In the following description, there are shown and described embodiments of the disclosed systems and methods for providing internally threaded bores in vehicle and other components. As it should be realized, the systems and methods are capable of other, different embodiments and its several details are capable of modification in various, obvious aspects all without departing from the devices and methods as set forth and described in the following claims.

Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed systems and methods, and together with the description serve to explain certain principles thereof. In the drawings.

Reference will now be made in detail to embodiments of the disclosed systems and methods for providing internally threaded bores in vehicle and other components, examples of which are illustrated in the accompanying drawing figures.

DETAILED DESCRIPTION

Preliminarily, the present disclosure describes systems and methods for forming internally threaded bores in formed components, primarily in the context of automotive composite material components. However, the skilled artisan will readily appreciate that the systems and methods equally find applicability in any manufacturing situation requiring formed components having internally threaded bores.

Figure 1:
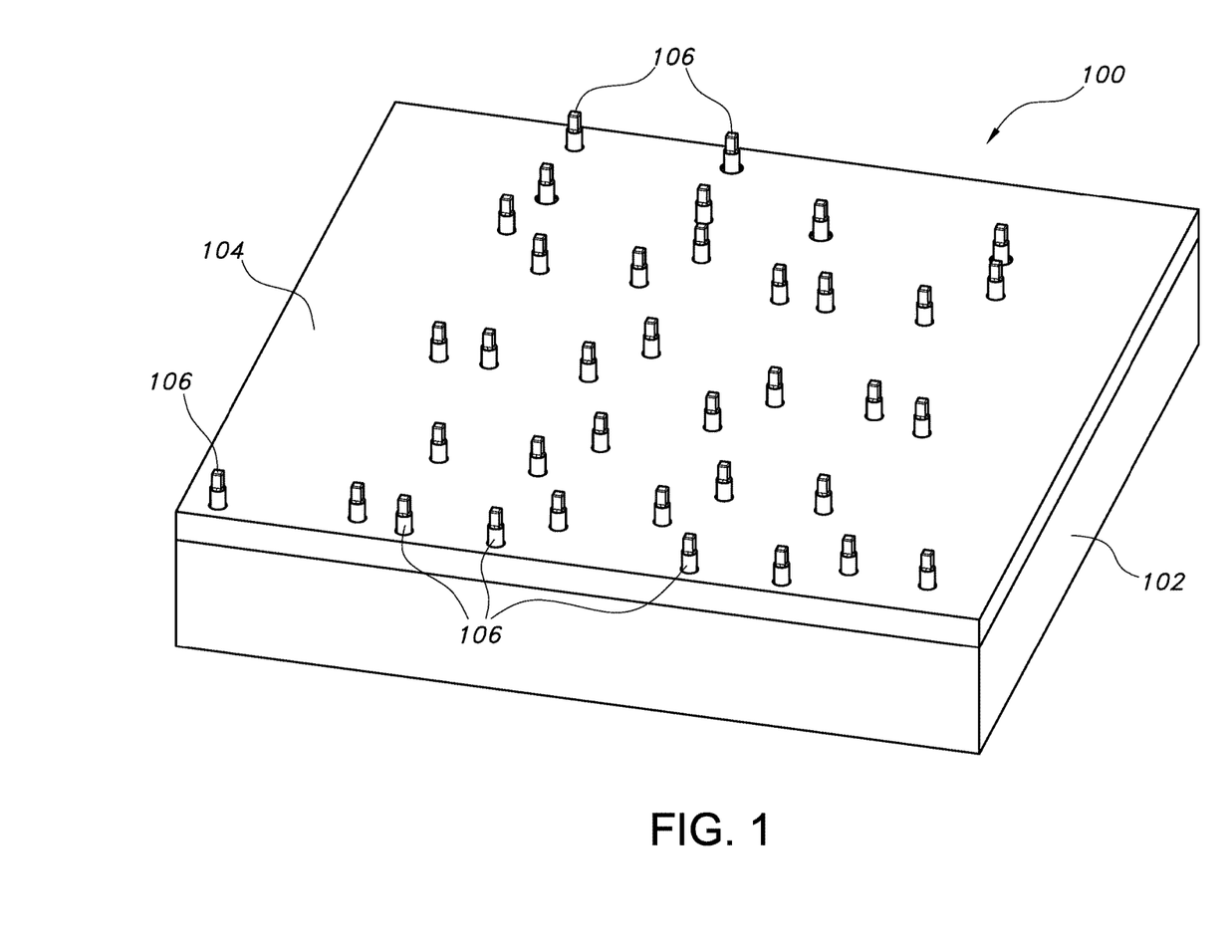
FIG. 1 shows a system for providing a component having internally threaded bores according to the present disclosure.

With reference to FIG. 1, a system 100 for forming an internally threaded bore in a formed component is provided. The system 100 includes a forming fixture 102 configured for defining a composite material component. Such forming fixtures 102 are well known in the art and do not require extensive discussion herein. However, as is known the forming fixture 102 interior defines a substantial mirror image of a component to be provided by molding. Thus, by dispensing a suitable composition into the interior of the forming fixture 102, allowing it to dry or otherwise cure, and removing the formed component (not shown in this view) from the forming fixture 102, the desired component is provided.

The system 100 further includes a locating fixture 104, configured for holding one or more thread forming tools 106 in a desired pattern corresponding to a desired pattern of bores to be defined in the composite material component defined by the forming fixture 102. In the embodiment depicted in FIG. 1, the locating fixture 104 and the forming fixture 102 each define a substantially rectangular exterior geometry. However, it will be appreciated that any suitable exterior geometry for the locating fixture 104 and the forming fixture 102 is contemplated, with the caveat that the fixtures must be configured whereby when abutted the thread forming tools 106 are held in an interior of the forming fixture to provide a bore having a desired depth.

Figure 2:
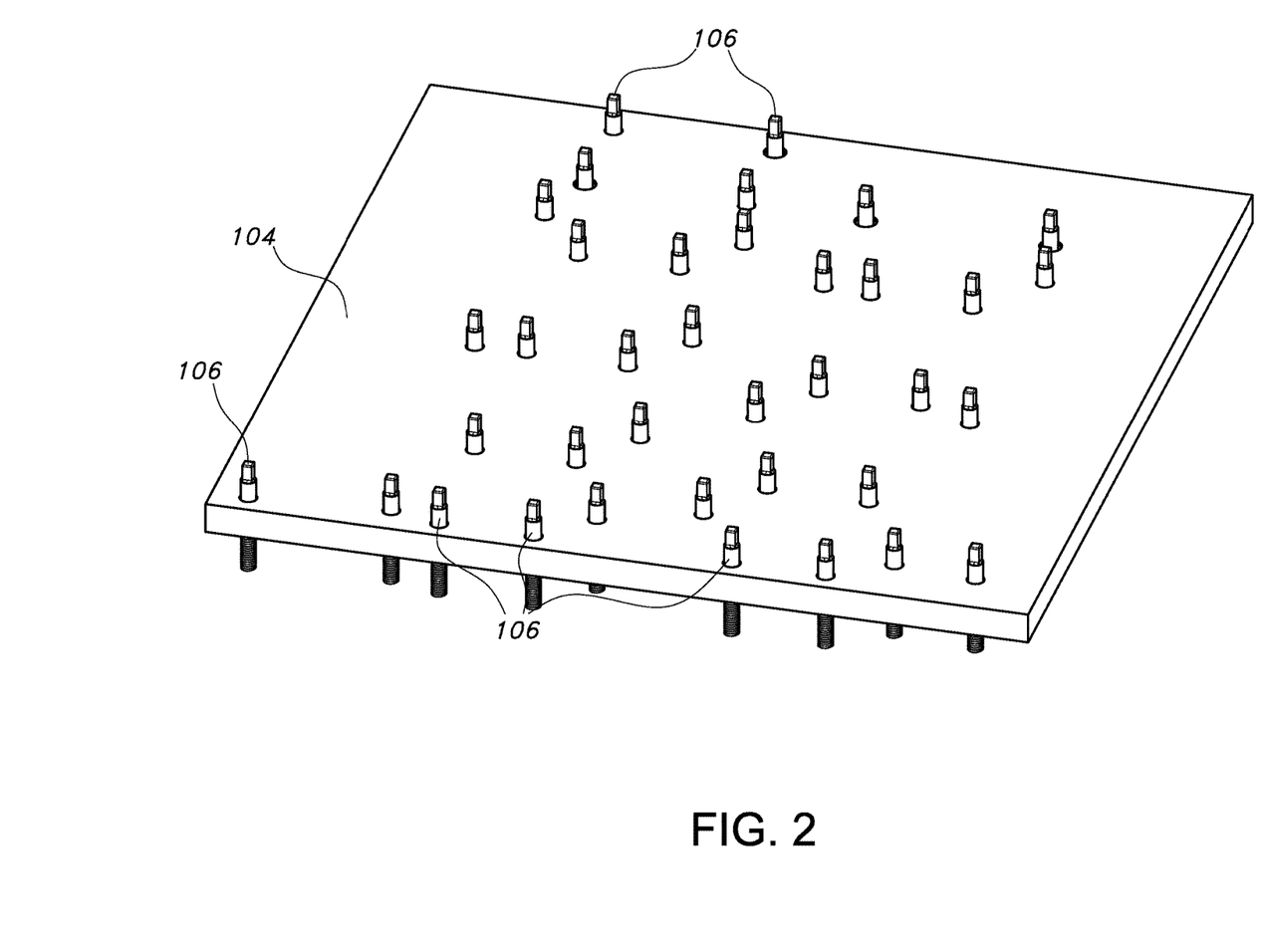
FIG. 2 shows a locating fixture and associated thread forming tools according to the present disclosure.

As shown in FIG. 2, the thread forming tools 106 are held in apertures defined in the locating fixture 104 to provide the desired bore pattern, whereby the thread forming tools traverse a thickness of the locating fixture with a portion of the tools held at a first surface of the locating fixture and a thread forming portion (described in detail below) held at a second, opposed surface of the locating fixture. In the depicted embodiment the thread forming tools 106 are shown held in a substantially perpendicular orientation relative to a plane defined by the locating fixture 104. However, in accordance with the orientation of the desired bores to be formed the thread forming tools 106 could be held at an angled orientation relative to the plane formed by the locating fixture 104.

Figure 3:
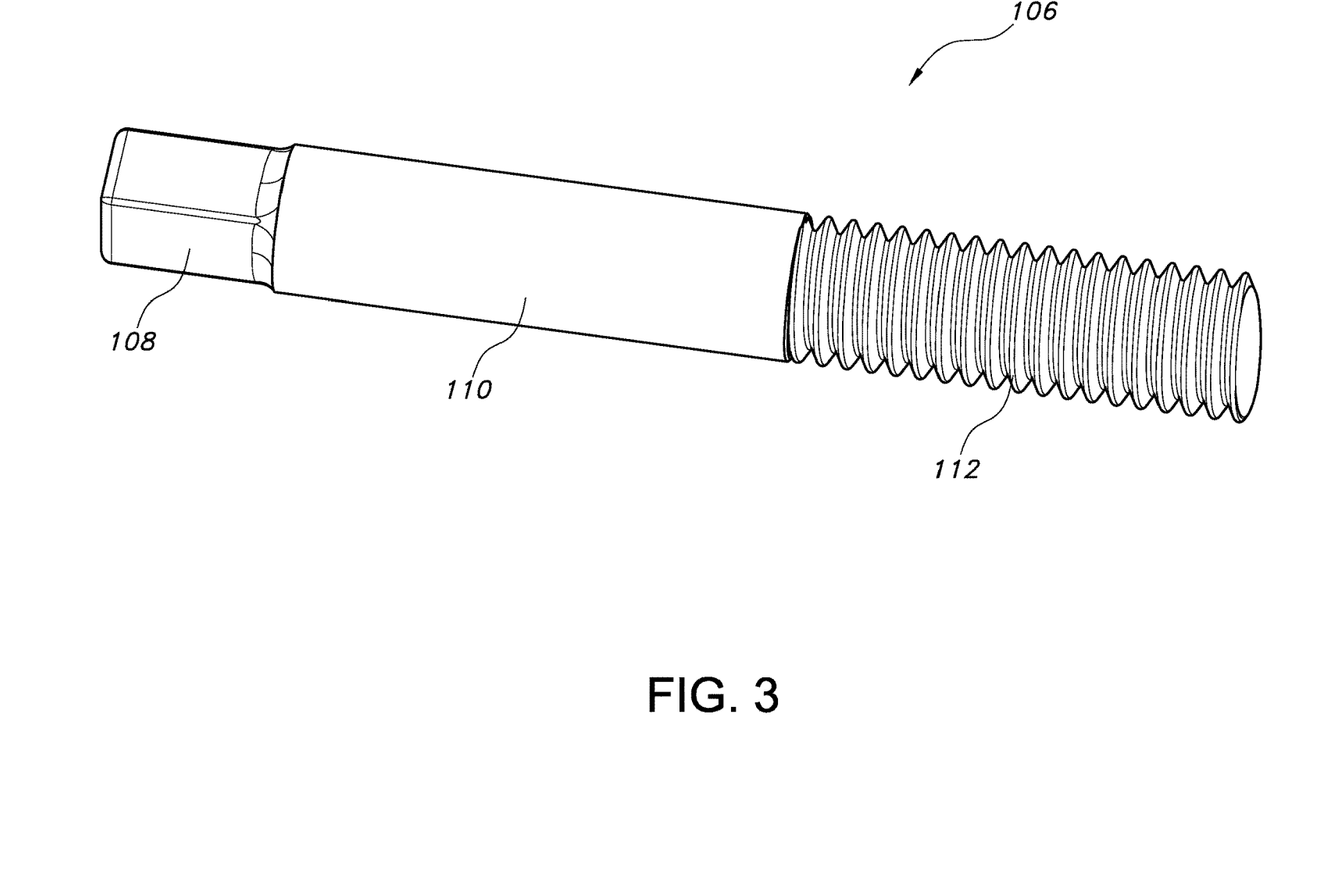
FIG. 3 shows a thread forming tool according to the present disclosure.

FIG. 3 depicts a representative thread forming tool 106 for use with the locating fixture 104 (not shown in this view) of the present disclosure. Each thread forming tool 106 includes a removal tool-engaging head 108, a locating fixture-spanning shank 110, and a thread forming portion 112. The head 108 is configured for engaging by a suitable removal tool, for example a wrench, a socket, a screwdriver head, and others. The shank 110 may comprise various lengths and diameters/circumferences according to the particular use contemplated, for example to accommodate particular thicknesses of locating fixture 104, to allow adjusting a depth at which the thread forming portion 112 is held relative to an interior of the forming fixture 102 (not shown), to overcome negative spindle clearance in near proximity situations, and to support a thread forming portion 112 defining a bore having a desired internal diameter.

Figure 4:
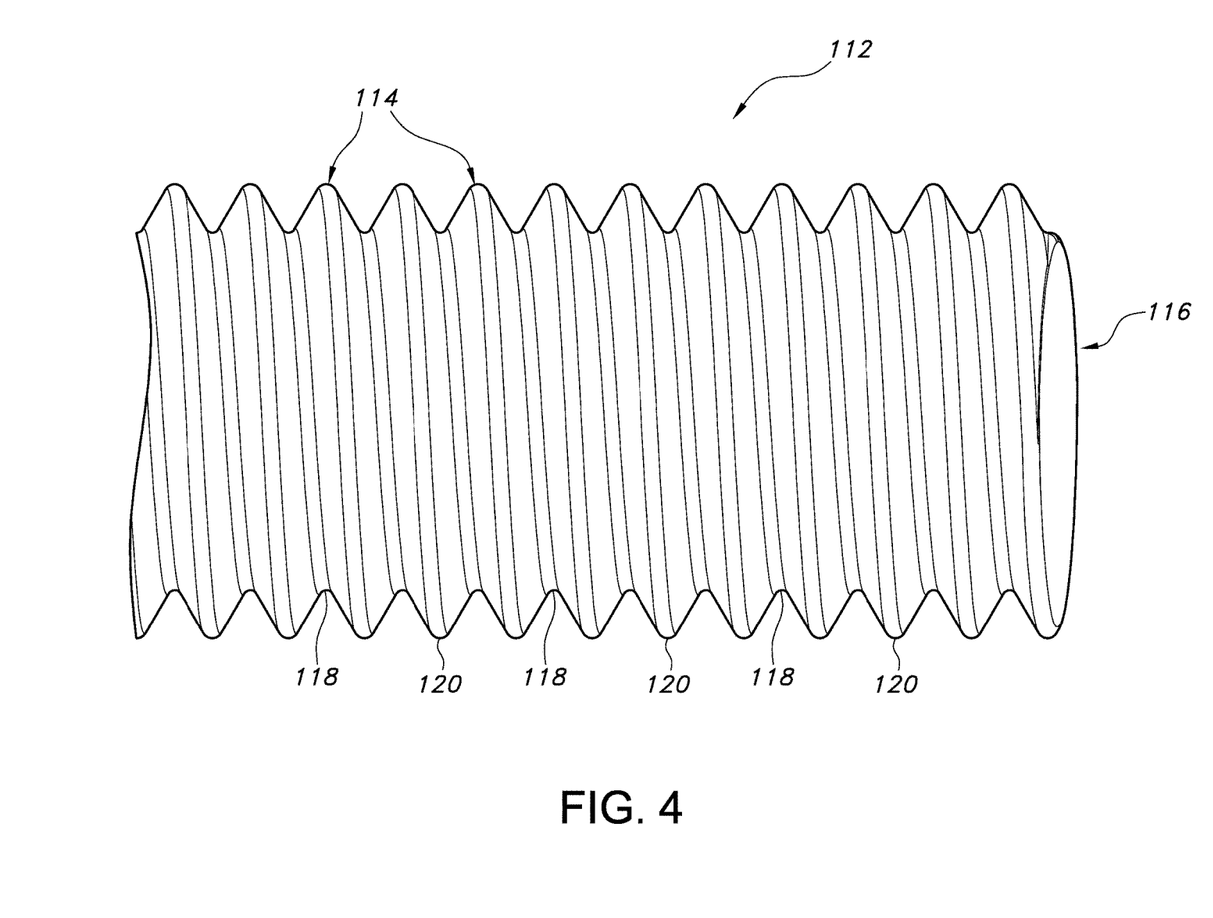
FIG. 4 shows a thread forming portion of the thread forming tool of FIG. 3.

A portion of a thread forming portion 112 is shown in FIG. 4. The thread forming portion comprises a plurality of ridges 114 provided on a cylinder 116 in the form of a helix. Any suitable configuration for ridges 114 is contemplated in accordance with the desired configuration of screwthreads formed thereby, for example to provide right- or left-handed screwthreads, various thread forms and pitch diameters, and other physical configurations. In the depicted embodiment, each ridge 114 defines a full root radius 118 and a full crest radius 120. That is, the ridges 114 are configured to provide a fillet or chamfered radius on each of the roots and crests of the formed threads. As will be appreciated, the described ridges 114 defining a full root radius 118 and a full crest radius 120 then serve as a mirror image to bore internal threads formed by dispensing a suitable composition around the thread forming tool 106. Thus, the bores formed using the described thread forming tools 106 will comprise an internal helix-shaped thread likewise comprising a plurality of ridges having full crest radii and full root radii. As is known, such fillets or chamfers distribute stress over a broader surface area, and so screwthreads having such structures are more durable and can bear larger loads. Such ridge configurations also eliminate sharp screwthread edges that are easily damaged.

In use (see FIG. 1), the locating fixture 104 including the one or more thread forming tools 106 is positioned adjacent to the forming fixture 102 whereby the thread forming tools are held in an interior of the forming fixture. It will be appreciated that the one or more thread forming tools 106 may be provided having thread forming portions 112 of a same or of different diameters, in accordance with the desired bore interior diameter to be formed at particular locations in the formed component. For example, a greater diameter thread forming portion 112 may be used to provide a greater interior diameter bore, thus allowing use of larger diameter and therefore stronger fasteners therein in portions of the formed component that require a stronger connection to another component compared to other portions of the component.

As shown, the locating fixture 104 and the forming fixture 102 are configured and dimensioned such that the locating fixture essentially defines a lid for the forming fixture. However, alternative configurations are contemplated. For example, the locating fixture 104 and the forming fixture 102 could be disposed side by side, or the locating fixture could define a floor for the forming fixture. Optionally, to improve ease of removal at least a portion of the thread forming tools 106 may be coated with a parting or release agent, or other suitable lubricant.

Next, a suitable composition for defining the component to be formed is dispensed into an interior of the forming fixture 102. A variety of moldable compositions are known for forming, e.g., automotive and other components, including without intending any limitation thermoplastics and thermoplastic resins, fiber-reinforced thermoplastics and thermoplastic resins, carbon fiber-reinforced materials, Kevlar-reinforced materials, materials reinforced other synthetic fibers, and the like. Likewise, a number of casting and/or molding techniques are known in the automotive and other industries and are contemplated for use in the presently described methods, including without intending any limitation injection molding, blow molding, matrix molding, spin casting, reaction injection molding (RIM), structural RIM, and others.

Figure 5:
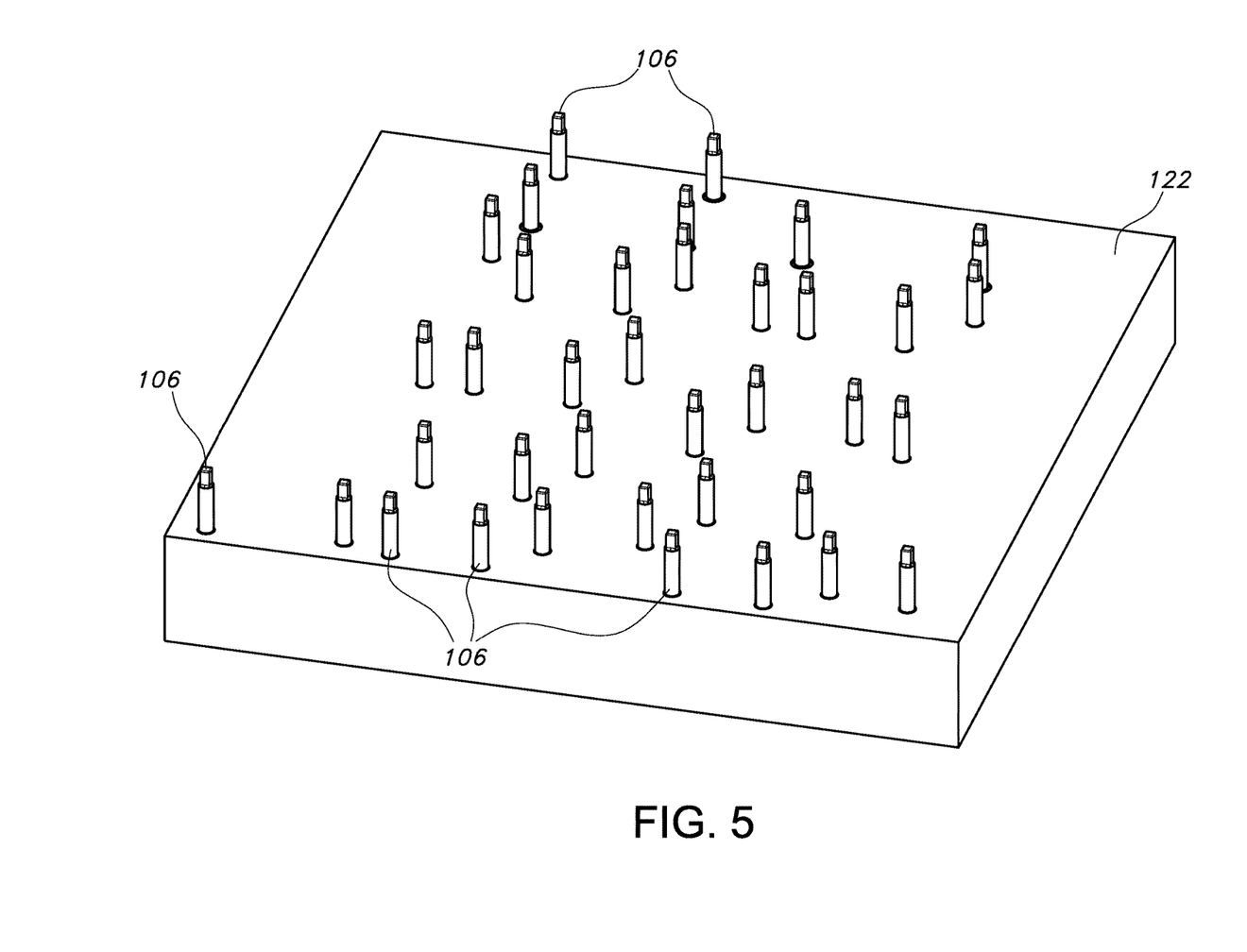
FIG. 5 shows a formed component including a plurality of thread forming tools disposed therein.

The composition is allowed to dry, set, and/or otherwise cure, thus defining the desired formed component 122. Once the composition has dried/cured, the locating fixture 104 and forming fixture 102 are removed (see FIG. 5), leaving the thread forming tools 106 disposed within the formed component 122 in the pattern defined by the locating fixture. As will be appreciated, the bores formed by the thread forming tools 106 will likewise be disposed in the pattern defined by the locating fixture. For convenience, the formed component 122 is depicted as having a substantially rectangular exterior configuration. However, the skilled artisan will understand that the component 122 will exit the forming fixture 102 in substantially the desired final configuration desired, with perhaps optional final machining and/or clean-up steps added to provide the final finished exterior configuration of the component and/or to remove excess material left by the molding or casting process.

Figure 6:
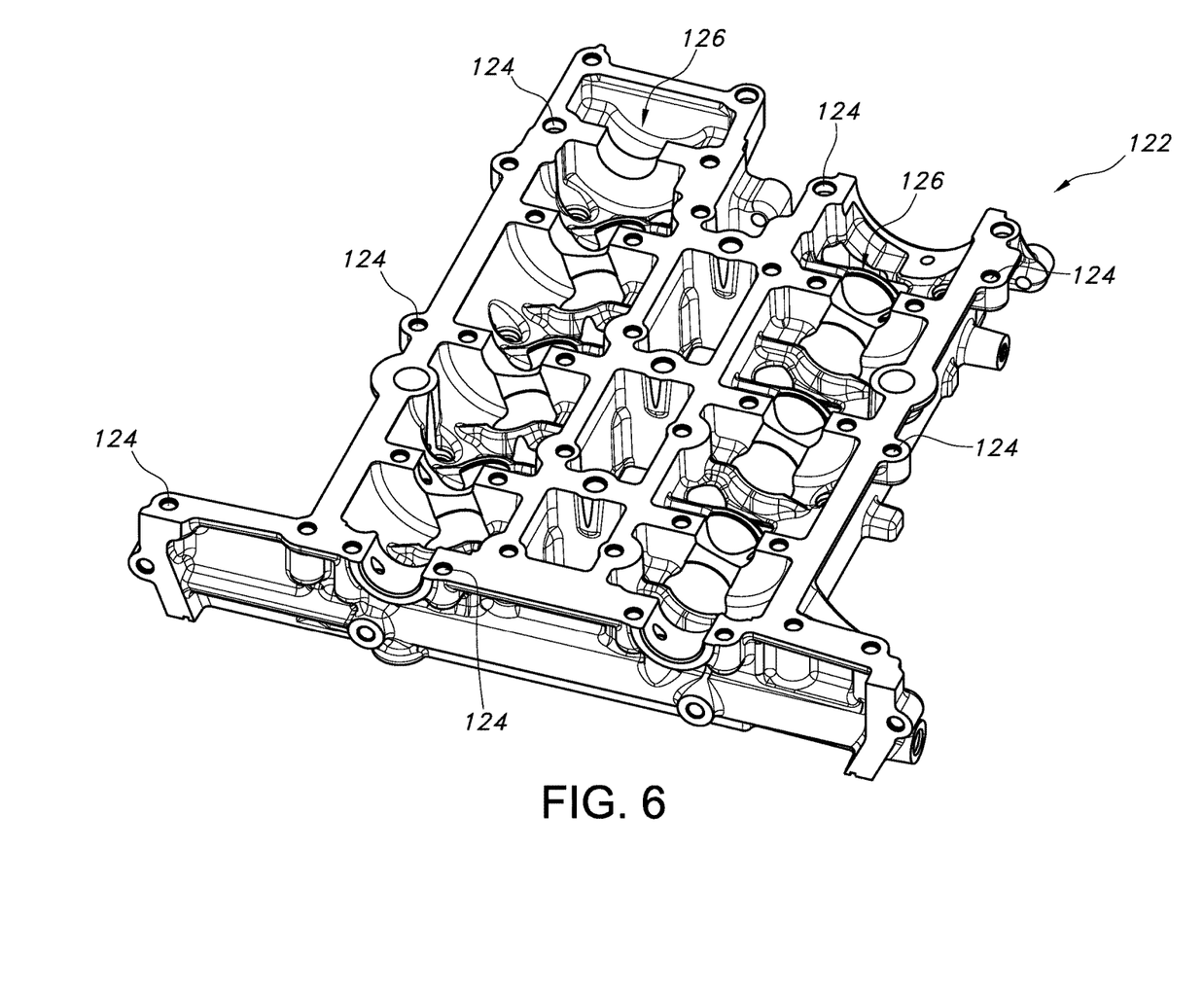
FIG. 6 shows a formed component including a plurality of internally threaded bores formed therein.

Next, the thread forming tools 106 are removed by a simple process of unscrewing to back them out of the formed bores, leaving a formed component 122 having internally threaded bores 124 (see FIG. 6) disposed at desired locations in the component. As described above, this is accomplished by using a suitable tool such as a wrench, socket, or screwdriver configured to engage the thread forming tool head 108. In the embodiment depicted in FIG. 6, the component 122 is a cam carrier manufactured of a composite material by molding as described above to provide a substantially conventional design, and defining receivers 126 for a camshaft (not shown).

Figure 7:
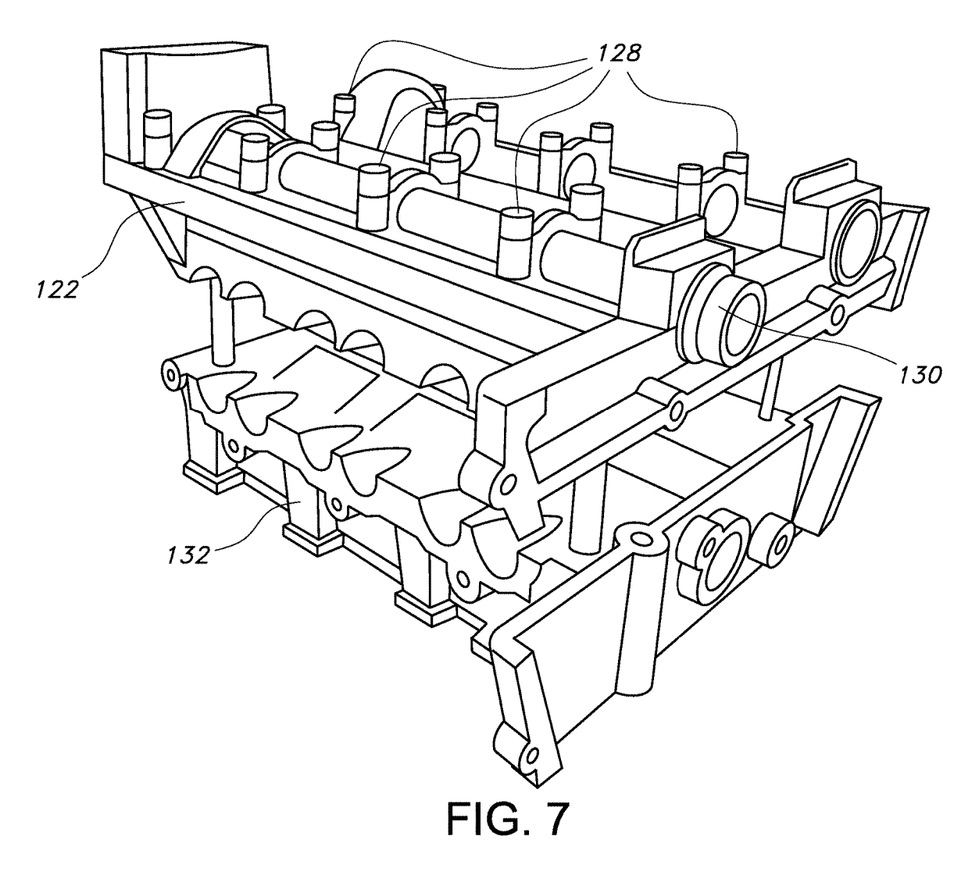
FIG. 7 shows the formed component of FIG. 6 assembled to other components.

As shown in FIG. 7, the composite component 122 can then be assembled to other components by way of fasteners 128 such as bolts or other suitable threaded fasteners dimensioned to engage the defined bores 124. In the depicted embodiment, fasteners 128 secure camshafts 120 to receivers 126, and in turn the composite cam carrier component 122 is secured to an aluminum or other metal cylinder head 132.

Accordingly, by the foregoing description systems and methods for providing internally threaded bores in a composite component 122 are provided. Advantageously, the described systems and methods provide a simple, effective, and robust way of providing such internally threaded bores during a process of forming a composite component 122. Still more, the described thread forming tools provide internally threaded bores having increased durability and supporting increased clamping loads, allowing stronger connections between the composite components 122 and adjoining components without resorting to supplemental measures for improving bore internal strength durability such as metallic inserts, crush limiters, or adhesives.

Obvious modifications and variations are possible in light of the above teachings. All such modifications and variations are within the scope of the appended claims when interpreted in accordance with the breadth to which they are fairly, legally and equitably entitled.

What is claimed:

1. A system for defining an internally threaded bore in a formed component, comprising:
    a locating fixture adapted to hold a plurality of thread forming tools each defining a thread forming portion in a predetermined configuration defining a pattern of internally threaded bores to be provided in the formed component; and
    a component forming fixture adapted for abutting the locating fixture whereby the plurality of thread forming tools are held in an interior of the forming fixture.

2. The system of claim 1, wherein the plurality of thread forming tools each further define a locating fixture-spanning shank.

3. The system of claim 1, wherein the plurality of thread forming tools each further include a removal tool-engaging head.

4. The system of claim 1, wherein the thread forming portion comprises a plurality of thread forming surfaces each defining a pitch, a crest fillet radius, and a root fillet radius.

5. The system of claim 4, wherein the plurality of thread forming surfaces are configured to define a bore having an interior helical thread defining a plurality of full crest radii and a plurality of full root radii.

6. The system of claim 1, wherein the formed component is formed of a material by a casting or molding process.

7. A method for defining an internally threaded bore in a formed component, comprising:
    providing a plurality of thread forming tools each defining a thread forming portion;
    by a locating fixture, holding the one or more plurality of thread forming tools in a predetermined configuration defining a desired pattern of internally threaded bores to be defined;
    disposing the locating fixture adjacent to a forming fixture configured to define the formed component whereby the plurality of thread forming tools are held in an interior of the forming fixture; and
    dispensing a material into the forming fixture to define the formed component around the plurality of thread forming tools.

8. The method of claim 7, further including removing the locating fixture to reveal the formed component having the plurality of thread forming tools held thereby.

9. The method of claim 8, further including removing the plurality of held thread forming tools.

10. The method of claim 7, including providing the plurality of thread forming tools each defining the thread forming portion comprising a plurality of thread forming surfaces each defining a pitch, a full crest fillet radius, and a full root fillet radius.

11. The method of claim 9, optionally including machining the component to a final desired exterior configuration.

12. The method of claim 7, wherein the material is a composite material.

13. The method of claim 7, wherein the formed component is provided by a casting or molding process.

* * * * *